US012638029B2

(12) United States Patent
Lee

(10) Patent No.: US 12,638,029 B2
(45) Date of Patent: May 26, 2026

(54) COMPRESSING SNAP GROMMET

(71) Applicant: Illinois Tool Works Inc., Glenview, IL (US)

(72) Inventor: Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 266 days.

(21) Appl. No.: 18/435,129

(22) Filed: Feb. 7, 2024

(65) Prior Publication Data

US 2024/0280123 A1 Aug. 22, 2024

Related U.S. Application Data

(60) Provisional application No. 63/446,126, filed on Feb. 16, 2023.

(51) Int. Cl.
*F16B 1/00* (2006.01)
*B60H 1/00* (2006.01)
(52) U.S. Cl.
CPC ........... *F16B 1/00* (2013.01); *B60H 1/00535* (2013.01); *F16B 2200/406* (2018.08)
(58) Field of Classification Search
CPC ........... F16K 15/102; F16K 5/00; F16K 5/10; H02G 3/0406
See application file for complete search history.

(56) References Cited

U.S. PATENT DOCUMENTS

| | | | | |
|---|---|---|---|---|
| 3,056,852 | A | * | 10/1962 | Sachs ................... H01R 13/585 |
| | | | | 16/2.5 |
| 3,091,795 | A | * | 6/1963 | Budwig ................. F16L 5/027 |
| | | | | 439/550 |
| 3,469,493 | A | * | 9/1969 | Fisher ................. F16B 19/1081 |
| | | | | 248/239 |
| 3,548,079 | A | * | 12/1970 | Wold ................... H02G 3/0675 |
| | | | | 285/915 |
| 3,836,269 | A | * | 9/1974 | Koscik ................. F16J 15/02 |
| | | | | 403/197 |
| 3,967,050 | A | * | 6/1976 | Makihara ............. H02G 3/0666 |
| | | | | 16/2.5 |
| 4,089,496 | A | * | 5/1978 | Mizusawa ........... H02G 3/0633 |
| | | | | D8/356 |
| 4,487,998 | A | * | 12/1984 | Pegram ................ H02G 3/0641 |
| | | | | 174/153 G |
| 4,626,620 | A | * | 12/1986 | Plyler .................. H02G 3/083 |
| | | | | 285/151.1 |
| 5,090,644 | A | * | 2/1992 | Lenker ...................... F16L 5/00 |
| | | | | 174/665 |
| 5,144,777 | A | * | 9/1992 | Fishel ..................... E04F 19/08 |
| | | | | 52/220.8 |

(Continued)

*Primary Examiner* — Daniel J Wiley
(74) *Attorney, Agent, or Firm* — McAndrews, Held & Malloy, Ltd.

(57) ABSTRACT

Disclosed is a grommet assembly for compressing a pliable component relative to a rigid component. The grommet assembly includes a flexible grommet and compression sleeve. The flexible grommet includes a grommet collar and a flared sidewall structure. The flared sidewall structure includes a plurality of fin elements and a plurality of gaps. The compression sleeve includes a sleeve collar and a vertical sidewall. The compression sleeve receives the flexible grommet and to compress it via the vertical sidewall.

20 Claims, 8 Drawing Sheets

(56)　　　References Cited

U.S. PATENT DOCUMENTS

| | | | | |
|---|---|---|---|---|
| 5,337,447 | A * | 8/1994 | Tanaka | H02G 3/083 |
| | | | | 16/2.2 |
| 5,537,714 | A * | 7/1996 | Lynch, Jr. | H02G 3/083 |
| | | | | 411/182 |
| 5,758,860 | A * | 6/1998 | Hanazaki | F28F 9/002 |
| | | | | 248/634 |
| 5,806,139 | A * | 9/1998 | Anderson | F16C 1/107 |
| | | | | 16/DIG. 42 |
| 7,358,448 | B2 * | 4/2008 | Auray | H02G 3/0691 |
| | | | | 174/650 |
| 7,708,489 | B2 * | 5/2010 | Trotter | F16B 12/26 |
| | | | | 403/194 |
| 8,096,017 | B2 * | 1/2012 | Van Walraven | F16L 5/00 |
| | | | | 16/2.1 |
| 8,253,043 | B1 * | 8/2012 | Kiely | H02G 3/0616 |
| | | | | 174/650 |
| 8,639,155 | B2 * | 1/2014 | Kato | G03G 15/0855 |
| | | | | 220/254.1 |
| 9,546,704 | B2 * | 1/2017 | Yasui | F16F 1/3732 |
| 9,894,963 | B2 * | 2/2018 | Choi | A44B 13/0088 |
| 9,954,347 | B1 * | 4/2018 | Volpone | H02G 3/0406 |
| 10,626,943 | B2 * | 4/2020 | Namiki | F16F 1/3732 |
| 10,748,455 | B2 * | 8/2020 | Lemacks | B65D 90/105 |
| 11,682,503 | B2 * | 6/2023 | Aoshima | H01B 17/66 |
| | | | | 174/37 |
| 2012/0146295 | A1 * | 6/2012 | Suzuki | H02G 3/22 |
| | | | | 277/606 |
| 2012/0291220 | A1 * | 11/2012 | Okuhara | B60R 16/0222 |
| | | | | 16/2.2 |
| 2016/0005516 | A1 * | 1/2016 | Okuhara | B60R 16/0222 |
| | | | | 174/650 |
| 2016/0180988 | A1 * | 6/2016 | Klein | H02G 3/22 |
| | | | | 174/153 G |
| 2016/0247609 | A1 * | 8/2016 | Wang | H02G 3/22 |
| 2019/0036317 | A1 * | 1/2019 | Okuhara | H01B 7/0045 |
| 2019/0111867 | A1 * | 4/2019 | Ogawa | B60R 16/0222 |
| 2020/0263811 | A1 * | 8/2020 | Lepper | F16L 5/10 |
| 2020/0279673 | A1 * | 9/2020 | Kiuchi | H02G 3/0462 |
| 2021/0305795 | A1 * | 9/2021 | Zimmerman | H02G 3/286 |
| 2022/0013951 | A1 * | 1/2022 | Kimura | H01R 13/74 |
| 2023/0093525 | A1 * | 3/2023 | Oota | H01B 17/583 |
| | | | | 174/668 |
| 2023/0115627 | A1 * | 4/2023 | Hallenberger | H01B 17/583 |
| | | | | 174/152 G |
| 2023/0127049 | A1 * | 4/2023 | Maruchi | F16L 5/02 |
| | | | | 174/668 |
| 2024/0136092 | A1 * | 4/2024 | Ando | B60R 16/0222 |
| 2024/0425001 | A1 * | 12/2024 | Ando | B60R 16/0222 |
| 2025/0062056 | A1 * | 2/2025 | Kiyota | H02G 3/22 |
| 2025/0087390 | A1 * | 3/2025 | Ando | B60R 16/02 |

* cited by examiner

COMPRESSING SNAP GROMMET

RELATED APPLICATION

The present application claims priority to U.S. Provisional Patent Application No. 63/446,126, filed Feb. 16, 2023, and entitled "Compressing Snap Grommet" which is hereby incorporated by reference in its entirety.

BACKGROUND

An automotive heating, ventilation, and air conditioning (HVAC) system is designed to control the interior climate of a vehicle, providing comfort to occupants by regulating temperature, humidity, and air circulation. Sealing gaps in an HVAC system increases safety, comfort, and overall well-being of vehicle occupants. To that end, seals can be positioned around objects to provide a fluid-tight seal, but these seals sometimes do not provide an adequate seal relative to the object. Accordingly, an existing solution is to compress the seal around and against the object using, for example, a zip tie or cable tie. This solution, however is not always effective and other existing solutions require the use of tools, which increases cost and time during assembly. Despite these advancements, a need exists for a compressing snap grommet to improve the effectiveness of the seal around and against the object.

SUMMARY

The present disclosure relates generally to a compressing snap grommet assembly, substantially as illustrated by and described in connection with at least one of the figures, as set forth more completely in the claims. In some examples, the compressing snap grommet assembly includes a grommet and sleeve.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 1b illustrates a partially assembled view of a HVAC assembly unit 100 of FIG. 1a.

FIG. 1c illustrates an assembled view of a HVAC assembly unit 100 of FIG. 1a.

FIG. 1d illustrates a top plan view of the assembled HVAC assembly unit 100 of FIG. 1a.

FIG. 1e illustrates a cross-sectional side elevational view of a partially-assembled HVAC assembly unit 100 taken along cut-line A-A (FIG. 1d).

FIG. 1f illustrates a cross-sectional side elevational view of an assembled HVAC assembly unit 100 taken along cut-line A-A (FIG. 1d).

DETAILED DESCRIPTION

Figure 1A:
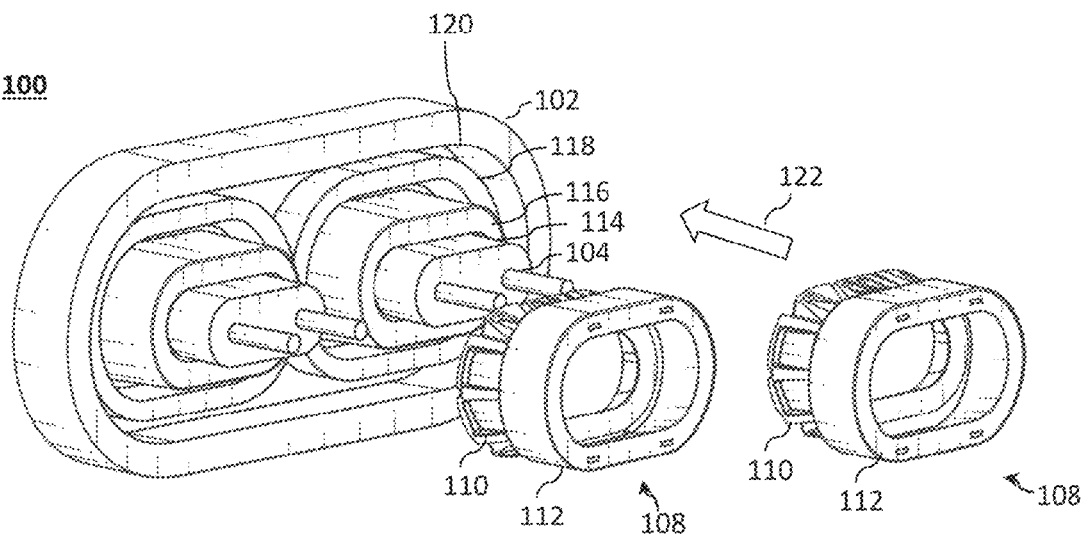
FIG. 1a illustrates an assembly view of a HVAC assembly unit 100 in accordance with an aspect of this disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The present disclosure provides a compressing snap grommet assembly having a grommet and sleeve.

In one example, a grommet assembly for compressing a pliable component relative to a rigid component comprises: a flexible grommet having a grommet collar and a flared sidewall structure, wherein the flared sidewall structure comprises a plurality of fin elements and a plurality of gaps;

and a compression sleeve having a sleeve collar and a vertical sidewall, wherein the compression sleeve is configured to receive the flexible grommet and to compress it via the vertical sidewall.

In another example, a flexible grommet having a grommet collar and a flared sidewall structure, wherein the flared sidewall structure comprises a plurality of fin elements and a plurality of gaps; and a compression sleeve having a sleeve collar and a vertical sidewall, wherein the compression sleeve is configured to receive the flexible grommet and to compress it via the vertical sidewall, and wherein the compression sleeve comprises one or more snap features formed in a portion of the vertical sidewall, each of the one or more snap features configured to retain the flexible grommet relative to the compression sleeve in a pre-assembled position.

In yet another example, a snap grommet assembly for compressing a pliable component relative to a rigid component comprises: a flexible grommet having a grommet collar and a flared sidewall structure, wherein the flared sidewall structure comprises a plurality of fin elements and a plurality of gaps, and wherein the grommet collar defines a grommet opening sized and shaped to receive at least a portion of the rigid component; and a compression sleeve having a sleeve collar and a vertical sidewall, wherein the compression sleeve is configured to receive the flexible grommet and to compress it via the vertical sidewall, wherein the sleeve collar defines a sleeve opening sized and shaped to receive at least a portion of the rigid component, and wherein the compression sleeve comprises one or more snap features formed in a portion of the vertical sidewall, each of the one or more snap features configured to retain the flexible grommet relative to the compression sleeve in a pre-assembled position.

In some examples, the compression sleeve comprises one or more snap features to engage the flexible grommet.

In some examples, the one or more snap features are configured to retain the flexible grommet relative to the compression sleeve in a pre-assembled position.

In some examples, the grommet collar defines a grommet opening sized and shaped to receive at least a portion of the rigid component.

In some examples, the sleeve collar defines a sleeve opening sized and shaped to receive at least a portion of the rigid component.

In some examples, each of the fin elements defines a rib feature configured to bias the fin element inwardly toward a central axis of the grommet assembly.

In some examples, each of the one or more snap features is formed in a portion of the vertical sidewall.

In some examples, each of the one or more snap features comprises a cantilevered tab with a snap.

In some examples, each of the fin elements defines a first ledge feature configured to couple with one of the one or more snap features to retain the flexible grommet relative to the compression sleeve in a pre-assembled position.

In some examples, each of the fin elements defines a second ledge feature configured to couple with one of the one or more snap features to retain the flexible grommet relative to the compression sleeve in an assembled position.

In some examples, the first ledge feature is positioned adjacent the grommet collar.

In some examples, the second ledge feature is positioned adjacent a wider end of the flared sidewall structure.

In some examples, each for the plurality of fin elements is separated from an adjacent one of the plurality of fin elements via one of the plurality of gaps.

In some examples, the grommet collar and the sleeve collar are oval or circular.

The basic components of an automotive HVAC system includes a compressor, a condenser, an evaporator, an expansion valve, a blower motor, a heater core, and various controllers and sensors. The compressor, which is typically located in the engine compartment, pressurizes and circulates the refrigerant throughout the HVAC system, while the condenser facilitates the release of heat from the refrigerant to the outside air. The evaporator, which is often inside the vehicle's dashboard, is responsible for absorbing heat from the air inside the vehicle, causing the refrigerant to evaporate. The expansion valve is typically positioned between the evaporator and the condenser and used to regulate the flow of refrigerant into the evaporator; controlling its pressure and temperature. The blower motor, which is often inside the HVAC unit (e.g., beneath the dashboard) powers the fan that circulates air through the HVAC system and into the vehicle's cabin.

The heater core, which is typically situated in the HVAC unit and connected to the vehicle's cooling system, is a small radiator-like unit that uses engine coolant to generate heat for warming the air in the cabin. Various controllers and sensors can be provided as a temperature control unit, which allows the driver and passengers to set and adjust the desired temperature. The various sensors monitor factors such as interior and exterior temperature, humidity, and sunlight to optimize climate control. The ductwork and vents, which are integrated into the vehicle's structure, connecting the HVAC unit to different areas within the interior to distribute conditioned air throughout the vehicle cabin.

These components work together to achieve effective climate control within the vehicle, ensuring that occupants can maintain a comfortable and desirable interior environment regardless of external weather conditions. For example, the flow typically starts with the compressor, followed by the condenser, expansion valve, and evaporator. The blower motor circulates air through the HVAC system, and the heater core provides warmth. Controls and sensors manage the system, while ductwork and vents distribute conditioned air throughout the vehicle's cabin.

Sealing the various connections in an automotive HVAC system offers a number of benefits, such as increasing energy efficiency, maintaining efficient system performance, preventing contaminant ingress, preventing of odors, and improving climate control. For example, a properly sealed connections prevent air and refrigerant leaks within the HVAC system. Sealing connections prevents the entry of contaminants such as dust, dirt, and moisture into the HVAC system. Contaminants can negatively impact system components, reduce efficiency, and lead to premature wear and failure. Air leaks in the HVAC system can allow outside odors to enter the passenger cabin. Properly sealed connections help maintain a clean and odor-free interior environment.

As can be appreciated, the various HVAC components are distributed between the engine compartment and the passenger cabin (e.g., as part of or under the dashboard); therefore, the components that interconnect these components (e.g., fluid lines, vents, wires, etc.) are typically required to pass between structural barriers (e.g., a firewall) that separates the engine compartment from the passenger cabin. In addition to fire safety and fume mitigation, sealing gaps in a firewall improves the effectiveness of the HVAC system. For example, it helps to maintain the desired temperature inside the cabin by preventing the intrusion of hot or cold air from the engine compartment.

Therefore, seals can be positioned around objects to provide a fluid-tight seal (e.g., to prevent seepage of air, liquid, etc.) in an HVAC system, but these seals sometimes do not always provide an adequate seal relative to the object. The disclosed compressing snap grommet assembly is applied to a soft material seal that is positioned, for example, between a dash panel and a tube block (e.g., an evaporator and condensing tube block).

Figure 1B:
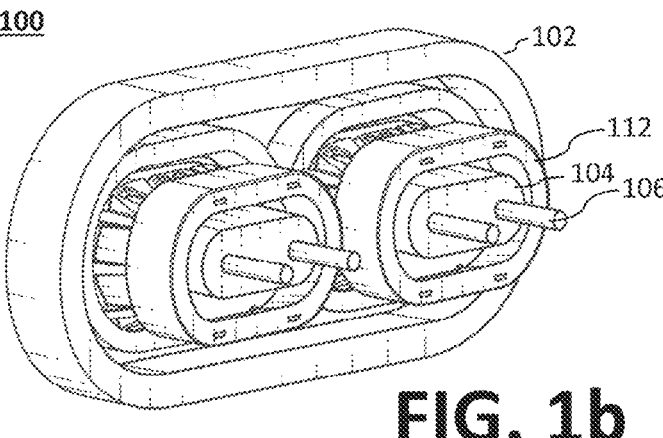
Figure 1C:
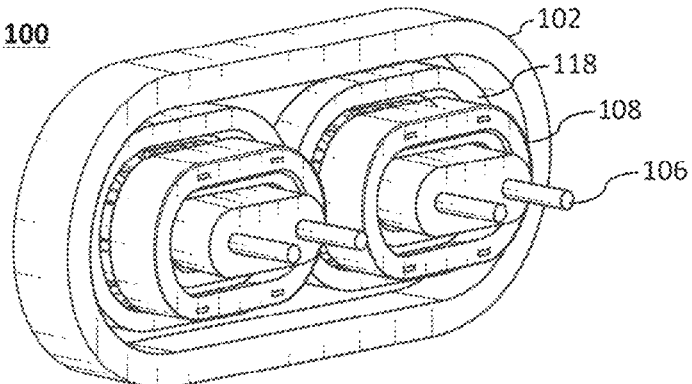
Figures 1D, 1E, 1F:
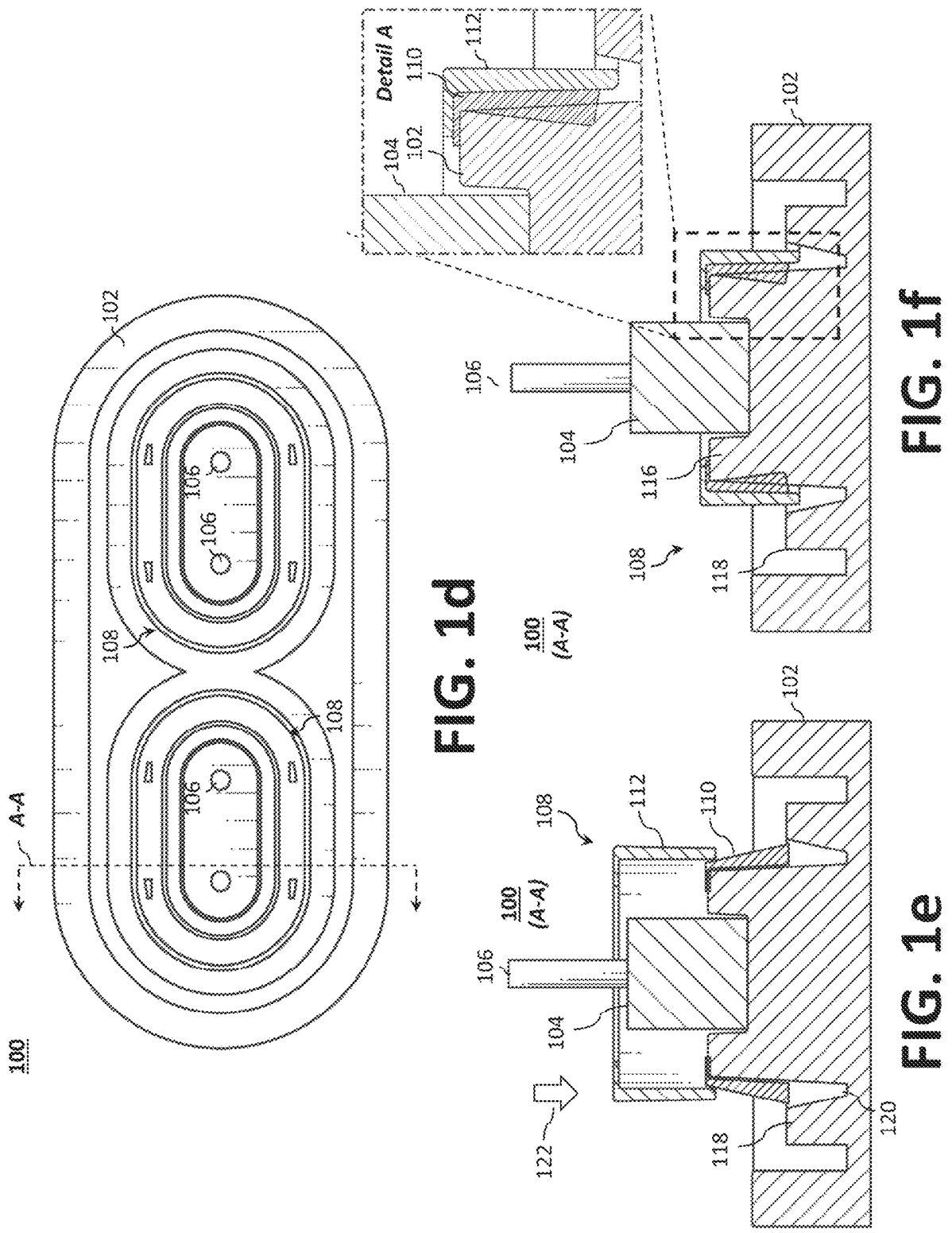

FIGS. 1a through 1f illustrate an example HVAC assembly unit 100. Specifically, FIGS. 1a through 1c illustrate, respectively, assembly, partially assembled, and assembled views of the HVAC assembly unit 100. FIG. 1d illustrates a top plan view of the assembled HVAC assembly unit 100, while FIGS. 1e through 1f illustrated, respectively, cross-sectional partially-assembled and assembled views taken along cutline A-A.

The HVAC assembly unit 100 generally includes a seal 102, a tube block 104 having one or more conduits 106 passing therethrough and/or extending therefore, and one or more compressing snap grommet assemblies 108. The compressing snap grommet assembly 108 is a multi-component assembly having, in this example, a flexible grommet 110 and a compression sleeve 112. While the seal 102 is illustrated with two tube blocks 104, the seal 102 may be sized and/or shaped for use with fewer tube blocks 104 (e.g., a single tube block 104) or more tube blocks (e.g., 3 or more tube blocks 104).

The tube block 104 can be a rigid component of the HVAC system that is fabricated from, for example, a metal (or metal alloy), rigid plastic, etc. In some examples, the tube block 104 is fabricated from or includes aluminum. The tube block 104 can part of or even integrated with the evaporator and condenser. The one or more conduits 106 facilitate connection of HVAC lines to the evaporator and/or condenser, for example.

The seal 102 is configured to seal the one or more tube blocks 104 relative to another component, such as a dashboard, firewall, etc. The seal 102 can be fabricated from a flexible material that, in some cases, is heat resistant. Example, flexible materials include, for example, flexible polyvinyl chloride (PVC) trim, ethylene propylene diene terpolymer sponge rubber compound, or a combination of materials, such as silicone, polypropylene and thermoplastic vulcanisate (TPV).

The seal 102 defines an opening 114 through which the tube block 104 passes. The opening 114 can be sized and shaped to correspond to the outer perimeter (or diameter) of the tube block 104. In some examples, the opening 114 can be slightly smaller (e.g., 10 percent smaller) than the outer perimeter of the tube block 104 such that the seal 102 stretches to accommodate the tube block 104, thus increasing the seal between the seal 102 and the tube block 104.

In the illustrated example, the seal 102 includes an inner annular portion 116 and an outer annular portion 118. The inner annular portion 116 surrounds and contacts a portion of the tube block 104 (via the opening 114). The illustrated inner annular portion 116 and the illustrated outer annular portion 118 are each illustrated with a perimeter shape that generally corresponds to the shape of the tube block 104 (in this example, generally oval). The illustrated inner annular portion 116 and the illustrated outer annular portion 118 are generally concentric relative to one another (and to the opening 114), where the inner annular portion 116 is smaller than the outer annular portion 118. As illustrated, the outer annular portion 118 is sized to define a valley 120 between the outer annular portion 118 and the inner annular portion 116.

Figures 2A, 2B:
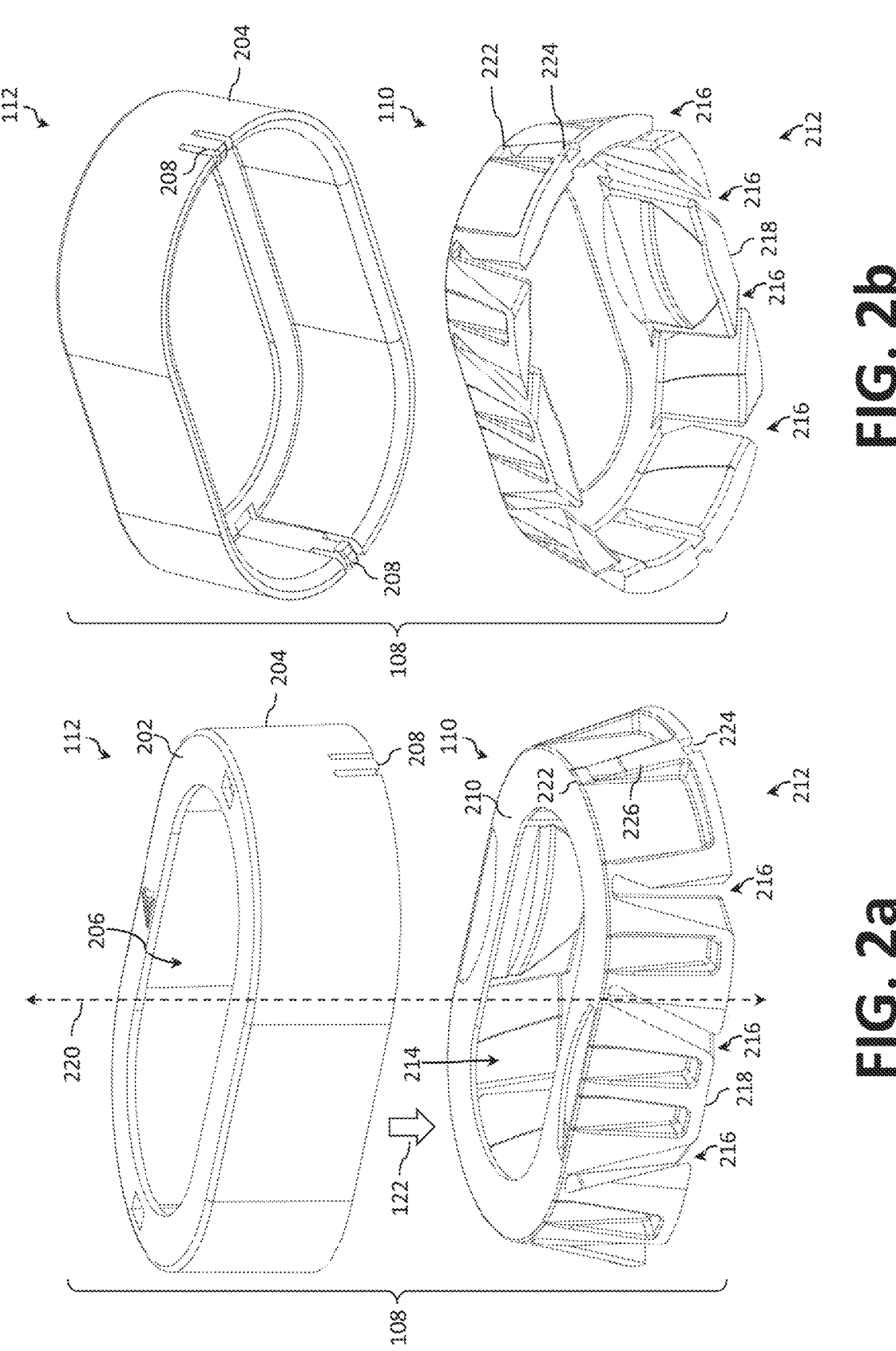
FIGS. 2a and 2b illustrate, respectively, top and bottom perspective assembly views of a compressing snap grommet assembly in accordance with an aspect of this disclosure.
Figures 2C, 2D:
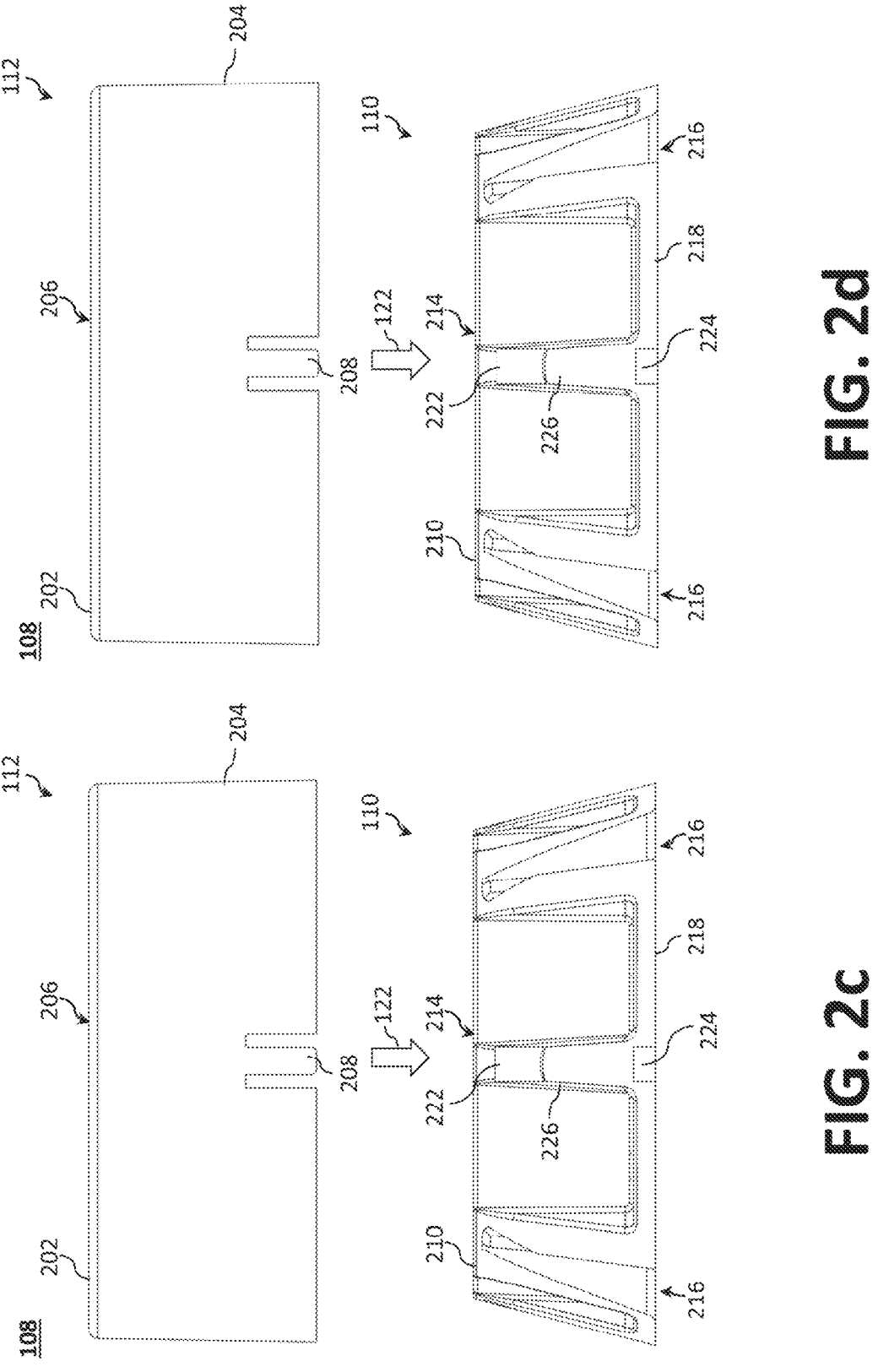
FIGS. 2c and 2d illustrate first and second side elevational assembly views of the compressing snap grommet assembly of FIGS. 2a and 2b.
Figures 2E, 2F:
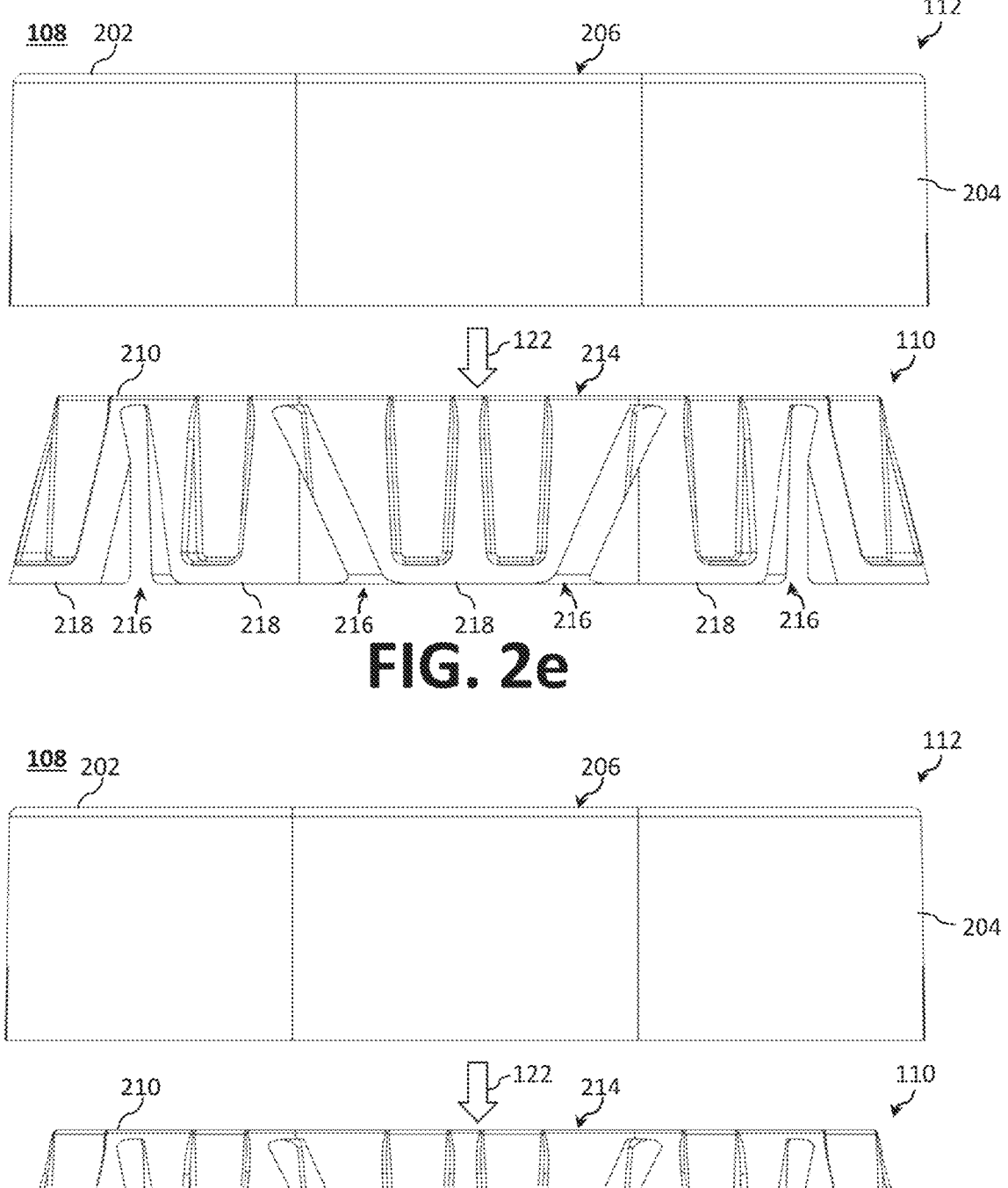
FIGS. 2e and 2f illustrate third and fourth side elevational assembly views of the compressing snap grommet assembly of FIGS. 2a and 2b.
Figures 2G, 2H:
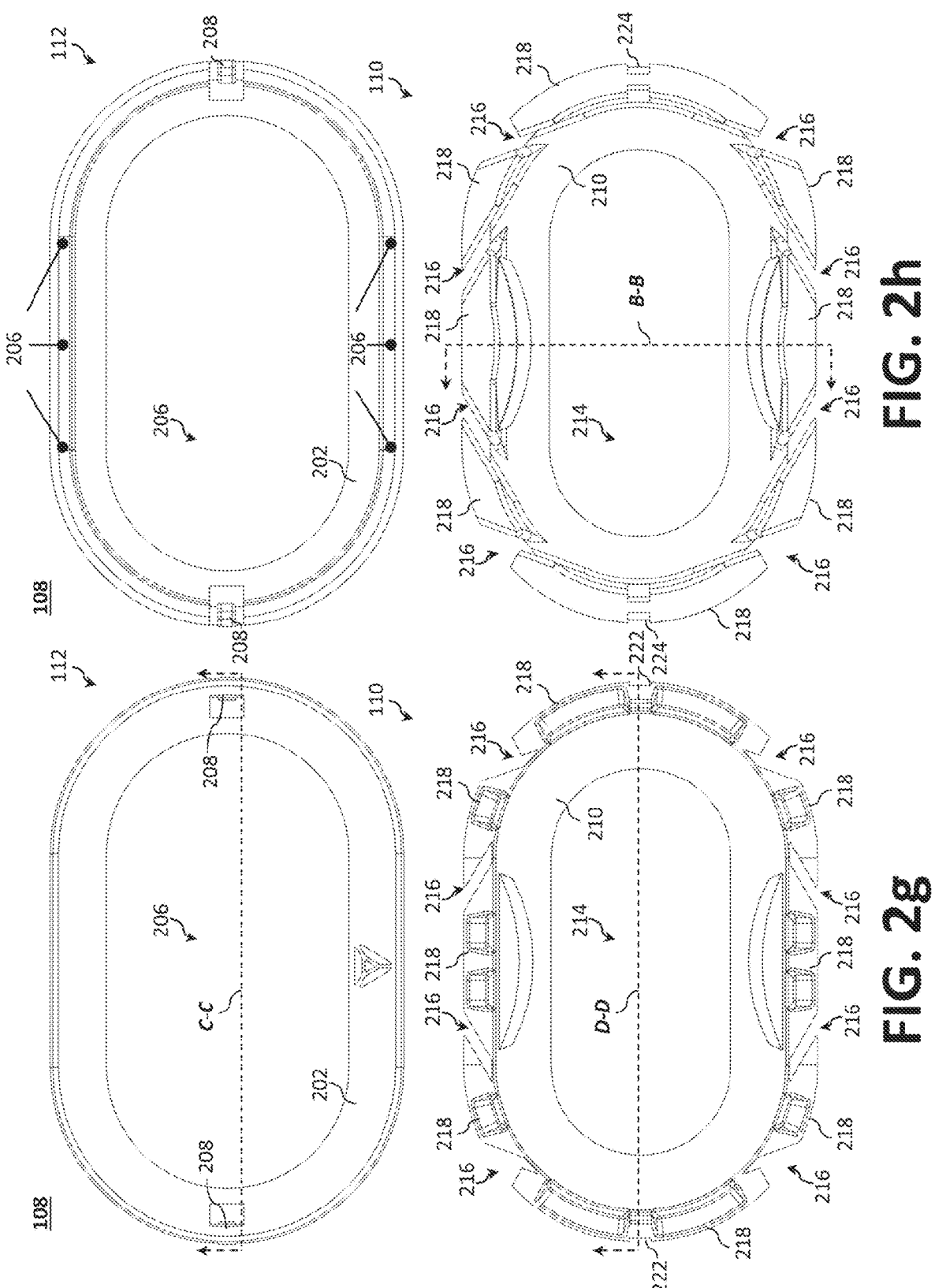
FIG. 2g illustrates a top plan assembly view of the compressing snap grommet assembly of FIGS. 2a and 2b.
FIG. 2h illustrates a bottom plan assembly view of the compressing snap grommet assembly of FIGS. 2a and 2b.

FIGS. 2a and 2b illustrate, respectively, top and bottom perspective assembly views of a compressing snap grommet assembly 108 in accordance with an aspect of this disclosure. FIGS. 2c through 2f illustrate, respectively, first, second, third, and fourth side elevational assembly views of the compressing snap grommet assembly 108, while FIGS. 2g and 2h illustrate top and bottom plan assembly views of the compressing snap grommet assembly 108 of FIGS. 2a and 2b.

The compressing snap grommet assembly 108 is a multi-component assembly that is used for enclosing or securing another object, such as a rigid component (e.g., the tube block 104) with a pliable component (e.g., the seal 102); however the compressing snap grommet assembly 108 can also be used for enclosing or securing other objects, such as cables, wire bundles, or other cylindrical or oval-shaped objects. The dimensions of the snap grommet assembly 108, including length, width, and height are designed to accommodate the specific requirements of the application.

Figure 3A:
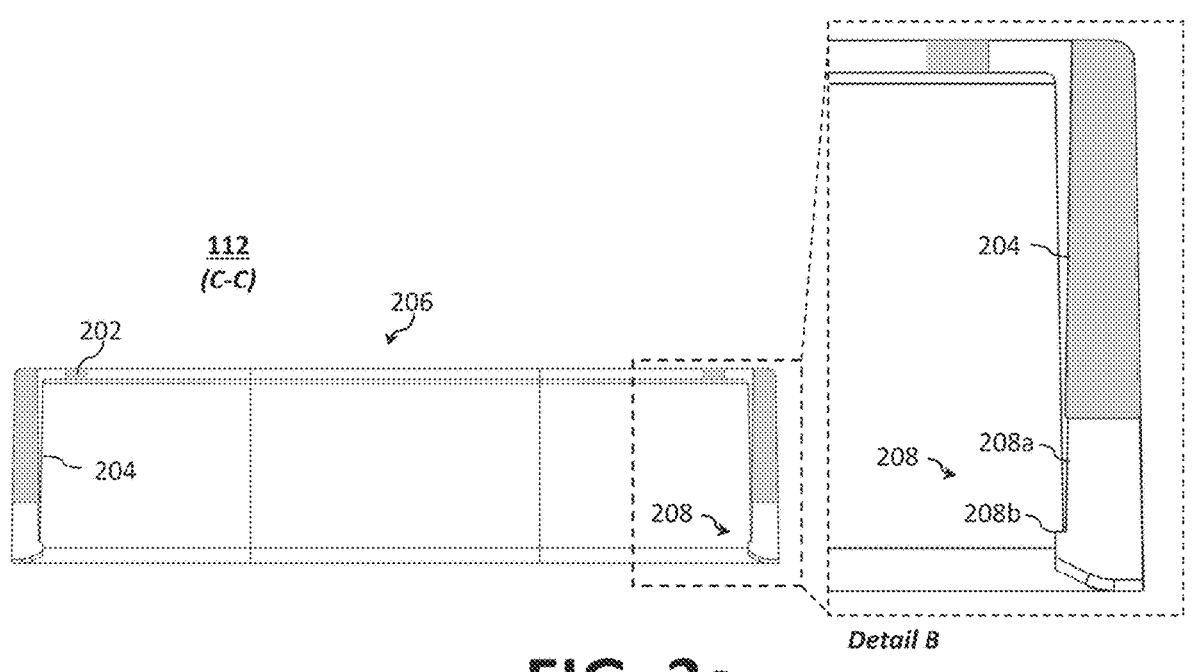
FIGS. 3a through 3d illustrate, respectively, cross-sectional views of the compression sleeve and the flexible grommet taken along cut-lines B-B (FIG. 2h), C-C (FIG. 2g), and D-D (FIG. 2g).
Figure 3B:
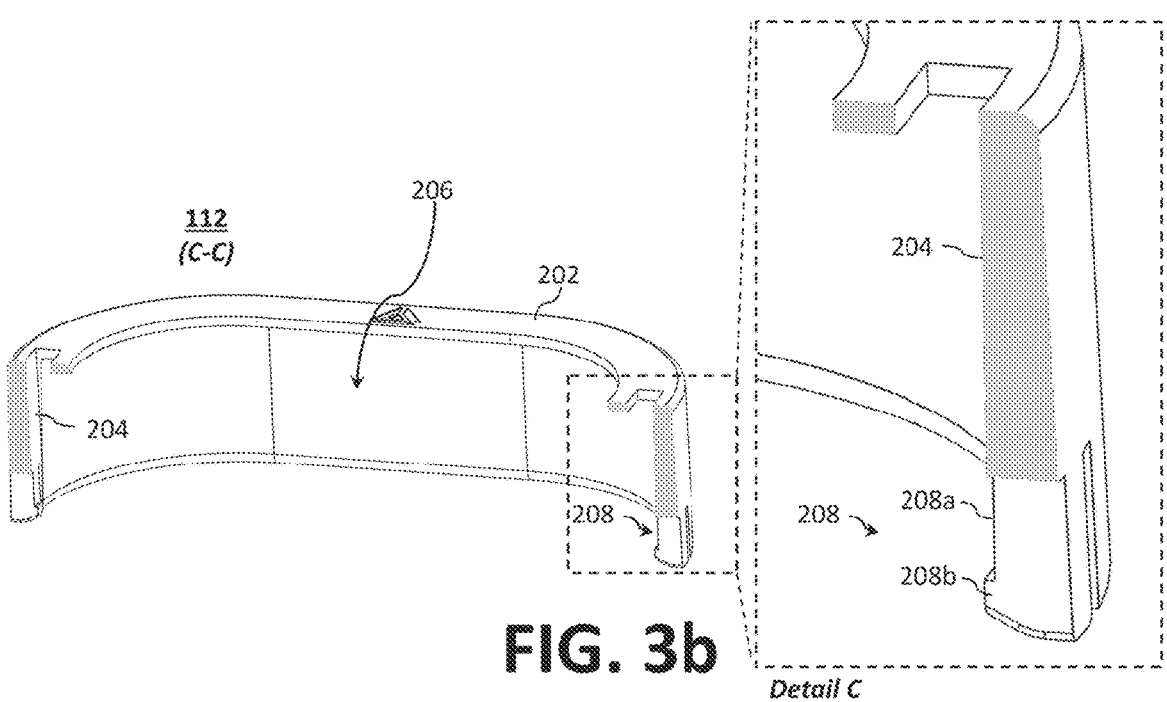
Figure 3C:
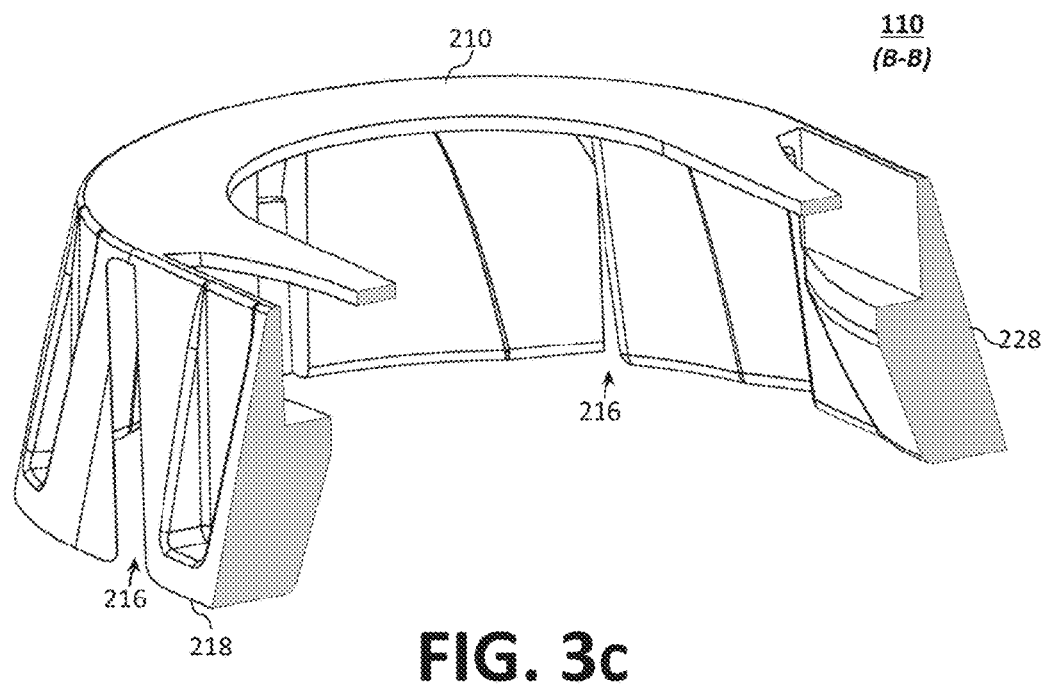
Figure 3D:
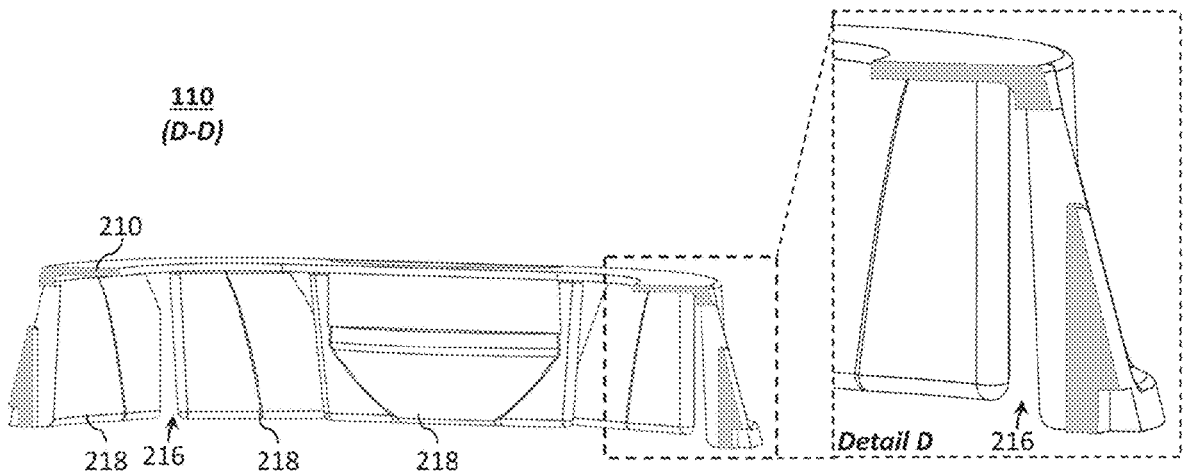

The compressing snap grommet assembly 108, in this example, generally comprises two components, a compression sleeve 112 and a flexible grommet 110. FIGS. 3a through 3d illustrate, respectively, cross-sectional views of the compression sleeve 112 and the flexible grommet 110 taken along cut-lines B-B (FIG. 2h), C-C (FIG. 2g), and D-D (FIG. 2g). Details B and C of FIGS. 3a and 3b, for example, illustrate details of the snap features 208 in accordance with an example. Detail D of FIG. 3d illustrate details of a cross section of the fin element 218 in accordance with an example.

The flexible grommet 110 and the compression sleeve 112 can be assembled together to compress soft materials, more specifically, as it pertains to an HVAC assembly unit 100, the inner annular portion 116 of the seal 102 against the tube block 104. For example, the compression sleeve 112 can be pushed or slipped over the flexible grommet 110 in direction 122 to form the compressing snap grommet assembly 108. When assembled, the compressing snap grommet assembly 108 can rest or otherwise be positioned in the valley 120 between the outer annular portion 118 and the inner annular portion 116.

The compression sleeve 112 generally comprises a sleeve collar 202 and a generally vertical sidewall 204. The sleeve collar 202 defines a sleeve opening 206 sized and shaped to receive at least a portion of the tube block 104. In some examples, the sleeve opening 206 is larger than the tube block 104 to maintain a gap between the tube block 104 and the compression sleeve 112 once assembled.

The illustrated compression sleeve 112 includes straight, vertical sidewalls 204 that run perpendicular to the sleeve collar 202, which is of the oval shape. The sidewalls 204 contribute to the structural integrity of the compression sleeve 112 and assist in maintaining a consistent compression force upon the flexible grommet 110 (when assembled). While the vertical sidewall 204 is illustrated as a continuous sidewall that follows the entire perimeter of the sleeve collar 202, a plurality of sidewalls 204 could instead be positioned along the perimeter of the sleeve collar 202 to serve as the vertical sidewall 204 (e.g., a sidewall assembly).

The compression sleeve 112 is configured to exert radial compressive forces upon installation. This compression is achieved through the interaction of the compression sleeve's 112 internal geometry, exemplified by the internal sidewalls 204, with the flexible grommet 110, and the object being secured or sealed-such as the seal 102 and tube block 104 assembly-resulting in a secure and precisely snug fit. In this example, the compression sleeve 112 is configured to effectively secure and compress the flexible grommet 110 in relation to the seal 102 and/or tube block 104. That is, the compression sleeve 112 is structured to apply compression, ensuring a tight and secure engagement of the flexible grommet 110 against both the seal 102 and the tube block 104.

The compression sleeve 112 has an elliptical, oval, round, or other configuration, providing a specific form factor that may be suitable for applications with space constraints or specific design requirements. In this example, the illustrated compression sleeve 112 is designed with a generally oval-shaped sleeve collar 202 with vertical sidewalls 204 and a generally oval-shaped sleeve opening 206; however, other configuration are contemplated depending on the application. For example, in instances where the tube block 104 is cylindrical, the sleeve collar 202 and sleeve opening 206 may be circular. Other shapes include, for example, quadrilateral shapes (e.g., squares, rectangles, etc.), pentagon shapes, hexagon shapes, trapezoids, etc.

The compression sleeve 112 can be fabricated from a rigid material, which can be plastic, metal, or other material chosen based on considerations such as durability, flexibility, and resistance to environmental factors. For example, a synthetic or semi-synthetic polymers (e.g., plastics, such as acrylonitrile butadiene styrene (ABS) and polyvinyl chloride (PVC), etc.), composite materials (e.g., fiber glass), or a combination thereof using a plastic injection technique, additive manufacturing, or otherwise. In some examples, the compression sleeve 112 may be fabricated using material extrusion (e.g., fused deposition modeling (FDM), stereolithography (SLA), selective laser sintering (SLS), material jetting, binder jetting, powder bed fusion, directed energy deposition, VAT photopolymerisation, and/or any other suitable type of additive manufacturing/3D printing process. In other examples, the compression sleeve 112 can be fabricated from a metal (or a metal alloy). In a particular embodiment, the compression sleeve 112 is can be made out of a hard polymeric material, such as polyvinylchloride (PVC), high-density polyethylene (HDPE), fluoroplastics (such as Teflon), polyamides (such as Nylons, especially Nylon 6, Nylon 66, Nylon 12, Nylon 13, and Nylon 11), polyethylene terephthalate (PET), polybutylene terephthalate (PBT), or polyoxymethylene (POM). The material chosen for the compression sleeve 112 may exhibit a degree of flexibility to facilitate easy installation and removal.

The compression sleeve 112 may be designed for snap-fitting or press-fitting onto the flexible grommet 110. Snap-fitting involves a mechanism where the compression sleeve 112 securely clicks into place, while press-fitting involves applying pressure to join the compression sleeve 112 and the flexible grommet 110. In this example, the compression sleeve 112 employs snap-fitting and comprises a plurality of snap features 208 configured to engage and/or retain the flexible grommet 110. While two snap features 208 are illustrated (one at each narrow end of the oval), additional snap features 208 can be employed. For example, snap features 208 may be positioned in the sidewall 204 on the long sides as indicated at one or more of locations 206 (FIG. 2h).

In the illustrated example, each of the cantilevered tabs 208a extends from a portion of the sidewall 204, with one end anchored or attached to the portion of the sidewall 204, and the other end projecting freely into space. The free end of the cantilevered tab 208a may feature one or more snaps 208b, holes, notches, or other mechanisms for engaging the flexible grommet 110. With reference to FIGS. 3a and 3b, each of the snap features 208 is formed in a portion of the sidewall 204 and is configured as a cantilevered tab 208a with a snap 208b (e.g., a ledge, clip, hook, or other grasping feature). The structure of the cantilevered tab 208a is a generally linear extension with one end fixed or attached to the sidewall 204, while the other end extends outward. The free end of the cantilevered tab 208a provides the snap 208b, which is illustrated as a ledge that generally forms a hook.

The flexible grommet 110 generally comprises a grommet collar 210 and a flared sidewall structure 212. The grommet collar 210 defines a grommet opening 214 sized and shaped to receive at least a portion of the tube block 104. The sleeve opening 206 may be the same size and/or shape as the grommet opening 214. The flexible grommet 110 features a flared sidewall structure 212 coupled to the grommet collar 210 of the oval shape. The flared sidewall structure 212 contributes to the structural integrity of the flexible grommet 110.

Like the compression sleeve 112, the flexible grommet 110 has an elliptical, oval, round, or other configuration, providing a specific form factor that may be suitable for applications with space constraints or specific design requirements. In this example, the illustrated flexible grommet 110 is designed with a generally oval-shaped grommet collar 210 with flared sidewall structure 212 and a generally oval-shaped grommet opening 214; however, other configuration are contemplated depending on the application. For example, in instances where the tube block 104 is cylindrical, the grommet collar 210 and grommet opening 214 are circular. Other shapes include, for example, quadrilateral shapes (e.g., squares, rectangles, etc.), pentagon shapes, hexagon shapes, trapezoids, etc.

The flared sidewall structure 212 comprises a plurality of fin elements 218 and a plurality of gaps 216. Each of the plurality of fin elements 218 can be an elongated, protruding structures connected at one end to the grommet collar 210 and extending radially outward from the central axis 220 of the compressing snap grommet assembly 108. One or more of the fin element 218 can define a rib feature 226 on an exterior surface to help bias the fin element 218 inwardly toward central axis 220.

Adjacent fin elements 218 are separated by a gap 216, creating a segmented flared sidewall structure 212 that allows for compression and deformation during assembly. For example, the gaps 216 are formed into the flexible grommet 110 to allow the fin elements 218 to move during installation. The gaps 216 provide flexibility and enable the flexible grommet 110 to adapt to varying shapes and sizes of the tube block 104 passing through it.

While eight fin elements 218 and eight gaps 216 are shown, additional or fewer fin elements 218 and gaps 216 may be employed based on, for example, needs and requirements around assembly and performance. Thus, the number of gaps 216 and fin elements 218 can vary depending on application and/or the size of the flared sidewall. During assembly, the compression sleeve 112 slides over the flexible grommet 110. The gaps 216 enable the fin elements 218 to move closer to one another to effective assume a smaller perimeter and fit within the vertical sidewalls 204 of the compression sleeve 112. In this example, prior to compression (e.g., a default state), the free ends of the flared sidewall structure 212 are flared outwardly, but, once assembled with the compression sleeve 112, the flared sidewall structure 212 is compressed to fit within the cavity defined by vertical sidewalls 204 of the compression sleeve 112.

One or more of the fin elements 218 comprises one of more features to engage and couple with the plurality of snap features 208. In the illustrated example, two of the fin elements 218 each include a first ledge feature 222 at an upper end of the fin element 218 (e.g., adjacent the grommet collar 210) that allows for snap features 208 to be located and hold the flexible grommet 110 in a pre-assembled position until being installed. The fin elements 218 may further include a second ledge feature 224 at a lower end of the fin element 218 (e.g., adjacent the wider, free end of the flared sidewall structure 212), which allow for the snap features 208 to be located and hold the flexible grommet 110 in an assembled position.

As discussed previously, compression is typically achieved through the interaction of the flexible grommet 110's internal geometry (e.g., the internal side of the flared sidewall structure 212) with the flexible grommet 110 and object it is securing (e.g., tube block 104), creating a secure and snug fit. The illustrated flexible grommet 110 is configured to secure and compress relative to the seal 102 and/or tube block 104.

The flexible grommet 110 is designed to apply compressive forces radially against, for example, the inner annular portion 116 of the seal 102 when assembled with the compression sleeve 112. When external pressure is applied, the flexible grommet 110 compresses radially, with the fins bending inward towards the central axis 220. This allows the flexible grommet 110 to accommodate and secure tube blocks 104 of different diameters. To that end, one or more of the fin elements 218 can be shaped to apply pressure in a targeted fashion. For example, with reference to FIG. 3c, the thickness and/or shape of the one or more of the fin elements 218 can be shaped to localize and/or increase compression via, for example, a thicker lobe or protrusion 228. When compression sleeve 112 is pushed in direction 122, the compression sleeve 112 evenly pushes on the fin element 218 as they all have rib feature 226 on them causing fin element 218 to move inward toward central axis 220. This motion causes the fin element 218 to move inward to compress the seal 102 against the tube block 104.

The flexible grommet 110 is constructed from a flexible material, allowing it to deform and compress when subjected to external forces. Example, flexible materials include, for example, flexible polyvinyl chloride (PVC) trim, ethylene propylene diene terpolymer sponge rubber compound, or a combination of materials, such as silicone, polypropylene and thermoplastic vulcanisate (TPV).

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A grommet assembly for compressing a pliable component relative to a rigid component, the grommet assembly comprising:
   a flexible grommet having a grommet collar and a flared sidewall structure extending therefrom, wherein the flared sidewall structure is flared outward at a leading end thereof and comprises a plurality of fin elements and a plurality of gaps; and
   a compression sleeve having a sleeve collar and a vertical sidewall,
   wherein the compression sleeve is configured to receive the flexible grommet and to compress it via the vertical sidewall.

2. The grommet assembly of claim 1, wherein the compression sleeve comprises one or more snap features to engage the flexible grommet.

3. The grommet assembly of claim 2, wherein the one or more snap features are configured to retain the flexible grommet relative to the compression sleeve in a pre-assembled position.

4. The grommet assembly of claim 3, wherein each of the one or more snap features is formed in an external portion of the vertical sidewall.

5. The grommet assembly of claim 3, wherein each of the one or more snap features comprises a cantilevered tab with a snap.

6. The grommet assembly of claim 2, wherein each of the fin elements defines a first ledge feature configured to couple with one of the one or more snap features to retain the flexible grommet relative to the compression sleeve in a pre-assembled position.

7. The grommet assembly of claim 6, wherein each of the fin elements defines a second ledge feature configured to couple with one of the one or more snap features to retain the flexible grommet relative to the compression sleeve in an assembled position.

8. The grommet assembly of claim 6, wherein the first ledge feature is positioned adjacent the grommet collar.

9. The grommet assembly of claim 8, wherein the second ledge feature is positioned adjacent a wider end of the flared sidewall structure.

10. The grommet assembly of claim 1, wherein the grommet collar defines a grommet opening sized and shaped to receive at least a portion of a rigid component.

11. The grommet assembly of claim 1, wherein the sleeve collar defines a sleeve opening sized and shaped to receive at least a portion of a rigid component.

12. The grommet assembly of claim 1, wherein each of the fin elements defines a rib feature configured to bias the fin element inwardly toward a central axis of the grommet assembly.

13. The grommet assembly of claim 1, wherein each of the plurality of fin elements is separated from an adjacent one of the plurality of fin elements via one of the plurality of gaps.

14. The grommet assembly of claim 1, wherein the grommet collar and the sleeve collar are oval.

15. The grommet assembly of claim 1, wherein the grommet collar and the sleeve collar are circular.

16. A snap grommet assembly comprising:
   a flexible grommet having a grommet collar and a flared sidewall structure,
   wherein the flared sidewall structure comprises a plurality of fin elements and a plurality of gaps; and
   a compression sleeve having a sleeve collar and a vertical sidewall,
   wherein the compression sleeve is configured to receive the flexible grommet such that the sleeve collar and grommet collar come into contact and the compression sleeve compresses the flexible grommet via the vertical sidewall, and wherein the compression sleeve comprises one or more snap features formed in a portion of the vertical sidewall, each of the one or more snap features configured to retain the flexible grommet relative to the compression sleeve in a pre-assembled position.

17. The snap grommet assembly of claim 16, wherein each of the one or more snap features comprises a cantilevered tab with a snap.

18. The snap grommet assembly of claim 16, wherein each of the fin elements defines a rib feature configured to bias the fin element inwardly toward a central axis of the grommet assembly.

19. A snap grommet assembly for compressing a pliable component relative to a rigid component, the snap grommet assembly comprising:

a flexible grommet having a grommet collar and a flared sidewall structure, wherein the flared sidewall structure comprises a plurality of fin elements and a plurality of gaps, and wherein the grommet collar defines a grommet opening sized and shaped to receive at least a portion of a rigid component; and a compression sleeve having a sleeve collar and a vertical sidewall, wherein the compression sleeve is configured to receive the flexible grommet and to compress it via the vertical sidewall, wherein the sleeve collar defines a sleeve opening sized and shaped to receive at least a portion of the rigid component, and wherein the compression sleeve comprises one or more snap features formed in an external portion of the vertical sidewall, each of the one or more snap features configured to retain the flexible grommet relative to the compression sleeve in a pre-assembled position, and wherein the plurality of fin elements are configured to engage a portion of the rigid component.

20. The snap grommet assembly of claim 19, wherein each of the fin elements defines a rib feature configured to bias the fin element inwardly toward a central axis of the grommet assembly.

* * * * *